INVENTORS
HARVEY N. BLISS
GEORGE W. WHITE
BY
Lindsey and Pritzman
ATTORNEYS

June 5, 1962 H. N. BLISS ETAL 3,037,666
PRESELECTOR MECHANISM FOR LIQUID DISPENSING APPARATUS
Filed Jan. 21, 1958 6 Sheets-Sheet 2

INVENTORS
HARVEY N. BLISS
GEORGE W. WHITE
BY
*Lindsey and Prutzman*
ATTORNEYS

June 5, 1962  H. N. BLISS ETAL  3,037,666
PRESELECTOR MECHANISM FOR LIQUID DISPENSING APPARATUS
Filed Jan. 21, 1958  6 Sheets-Sheet 3
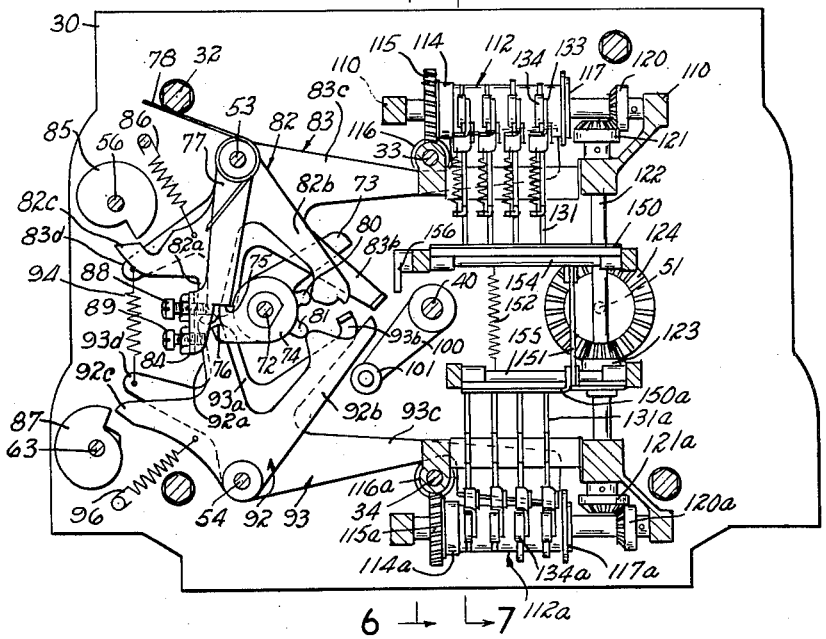
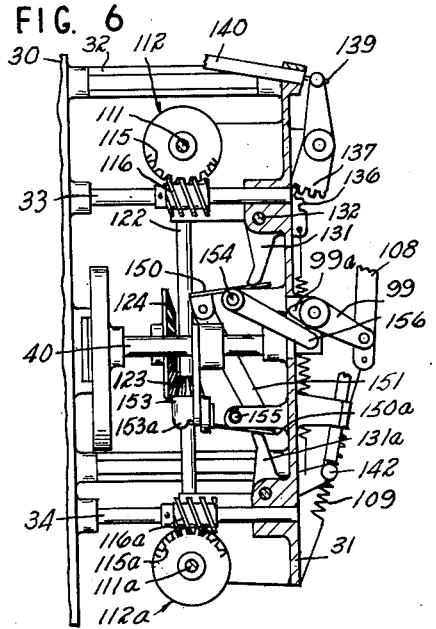
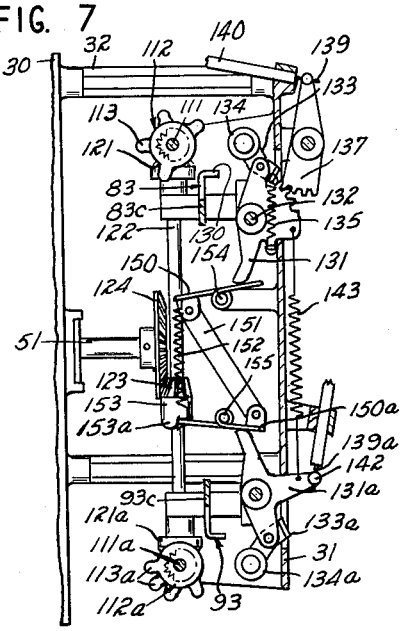
INVENTORS
HARVEY N. BLISS
GEORGE W. WHITE
BY
Lindsey and Brutzman
ATTORNEYS June 5, 1962 H. N. BLISS ETAL 3,037,666
PRESELECTOR MECHANISM FOR LIQUID DISPENSING APPARATUS
Filed Jan. 21, 1958 6 Sheets-Sheet 4

*INVENTORS*
*HARVEY N. BLISS*
*GEORGE W. WHITE*
BY
*Lindsey and Pritzman*
ATTORNEYS June 5, 1962   H. N. BLISS ETAL   3,037,666
PRESELECTOR MECHANISM FOR LIQUID DISPENSING APPARATUS
Filed Jan. 21, 1958   6 Sheets-Sheet 5

INVENTORS
HARVEY N. BLISS
GEORGE W. WHITE
BY
Lindsey and Pritzman
ATTORNEYS

June 5, 1962   H. N. BLISS ETAL   3,037,666
PRESELECTOR MECHANISM FOR LIQUID DISPENSING APPARATUS
Filed Jan. 21, 1958   6 Sheets-Sheet 6

INVENTORS
HARVEY N. BLISS
GEORGE W. WHITE
BY
*Lindsey and Prutzman*
ATTORNEYS

United States Patent Office 3,037,666
Patented June 5, 1962

3,037,666
PRESELECTOR MECHANISM FOR LIQUID
DISPENSING APPARATUS
Harvey N. Bliss, Windsor, and George W. White, West Hartford, Conn., assignors to Veeder-Root, Incorporated, Hartford, Conn., a corporation of Connecticut
Filed Jan. 21, 1958, Ser. No. 710,306
32 Claims. (Cl. 222—16)

The present invention relates generally to liquid dispensing apparatus and is concerned more particularly with a mechanism for use in connection with such apparatus whereby the operator may conveniently set the apparatus to dispense the amount of liquid desired by the customer either in terms of volume or the amount of money which he wishes to spend and whereby the dispensing operation will terminate automatically upon the delivery of the preselected quantity of liquid or an amount of liquid having the preselected cost.

For convenience, the invention will be described in connection with gasoline dispensing apparatus of the type used in gasoline filling stations, although the use of the invention is not necessarily limited thereto. In gasoline filling stations, the standard gasoline dispensing apparatus commonly used today comprises a pumping or dispensing apparatus having a register type of computer for indicating the gallonage and money value or cost of the gasoline dispensed. The operator usually turns the apparatus on and off and resets the register by means of manually operated controls. In some stations as an aid to the operator, the gasoline dispensing equipment is also provided with an automatic shut-off control mechanism in the hose nozzle which will automatically terminate the dispensing operation when the customer's gasoline tank is full. This additional control apparatus is of limited utility, however, because the customer usually desires to purchase a specified quantity or value of gasoline instead of merely filling his tank. There are some forms of preselecting apparatus available on the market for use with liquid dispensing apparatus to provide for automatic shut off at the completion of the dispensing of a preselected quantity of the liquid, but such apparatus generally has not been deemed to be sufficiently versatile and adaptable to warrant its use with gasoline dispensing apparatus in gasoline filling stations and have not met with commercial acceptance for this purpose.

The aim of the present invention is to provide a control mechanism for use with liquid dispensing apparatus which can be set in a simple and convenient manner for automatically terminating the dispensing operation upon the delivery of a preselected quantity or cost of liquid dispensed.

A further aim is to provide such a mechanism which is adapted for use with dispensing apparatus of the type now used commercially in gasoline filling stations including compactness and small size to permit the same to be conveniently installed within a standard pump housing without interference with the remainder of the dispensing mechanism.

Another aim is to provide a control mechanism having the desired automatic preselector shut-off feature which will not interfere with the normal use of the dispensing apparatus and which will not place a burden upon the operator which will interfere with efficient operation of the dispensing equipment.

Included in the above aim is the provision of a control mechanism of the type referred to which is simple to operate with a minimum of instructions and training and which, if desired, may be arranged for a simple and convenient push-button operation.

A further aim is to provide a preselector mechanism of the type referred to which is accurate in operation so that the preselected desired quantity or value of liquid dispensed will be precisely delivered. Included in this aim is to provide an arrangement for overcoming inaccuracies due to variations in dilation of the dispensing hose.

A further aim is to provide a control mechanism for a minimum of parts which can be fabricated and assembled at low cost and yet which will be rugged and efficient in operation so as to provide a long trouble-free service life.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Referring to the drawings:

FIG. 5 is a cross-sectional view taken along the line 5—5 of FIG. 4;

FIG. 6 is a cross-sectional view taken along the line 6—6 of FIG. 5;

FIG. 7 is a cross-sectional view taken along the line 7—7 of FIG. 5;

Figure 1:
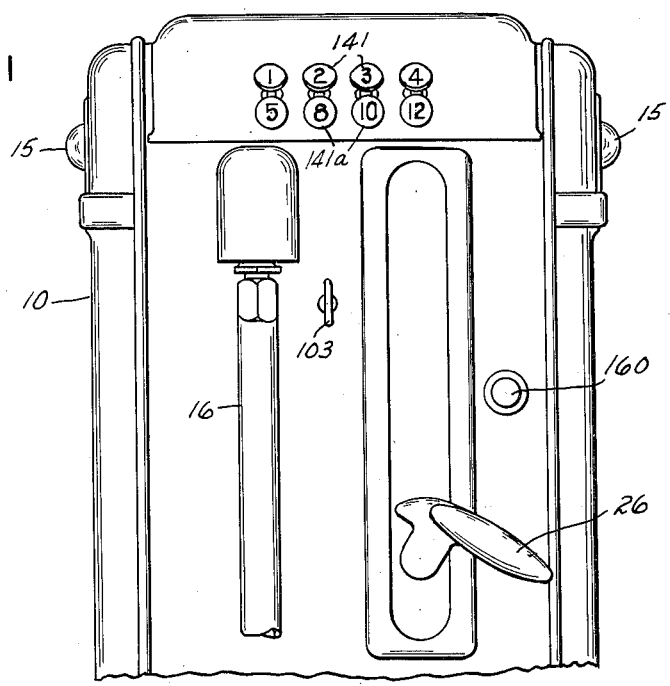
FIG. 1 is a fragmentary side view of a gasoline dispensing apparatus having an embodiment of the preselector mechanism of the present invention installed therein.

As mentioned above, the preselector mechanism of the present invention is disclosed in the drawings in combination with a standard gasoline dispensing apparatus since this is a principal anticipated use of the invention, although the invention is not necessarily limited thereto. The purpose of the control mechanism is to permit the operator to set the apparatus for the delivery of a preselected amount of gasoline to be dispensed either in terms of volume or cost whereupon the delivery of the gasoline will be terminated automatically upon the delivery of the preselected amount. To facilitate the description of the specific embodiment of the invention shown in the drawings, the principal components of the apparatus will be described separately.

The Gasoline Dispensing Apparatus

Figure 2:
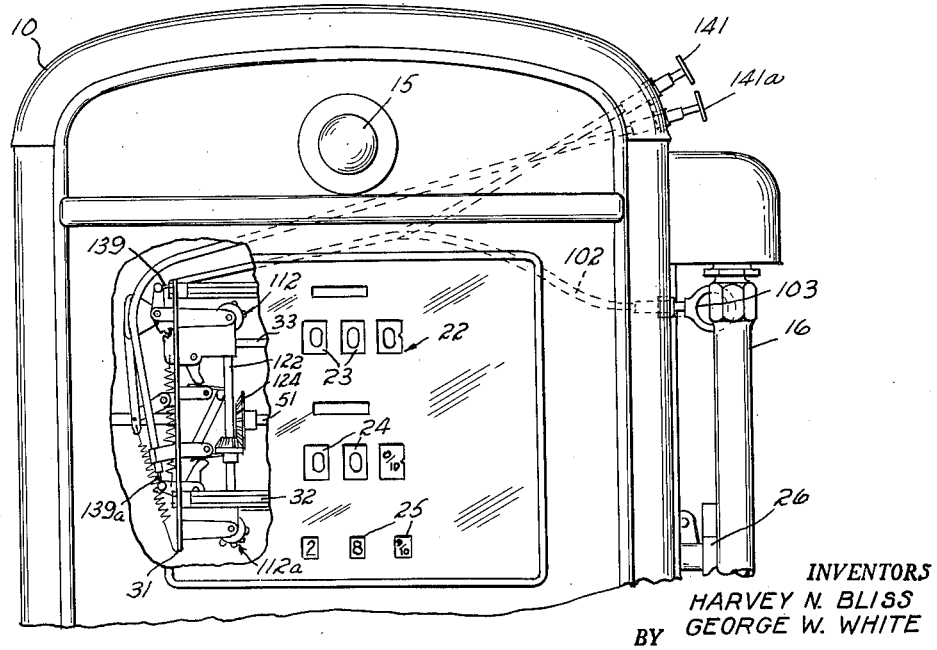
FIG. 2 is a fragmentary front view of the apparatus shown in FIG. 1 with the front partially cut away to show a portion of the preselector mechanism.
Figure 3:
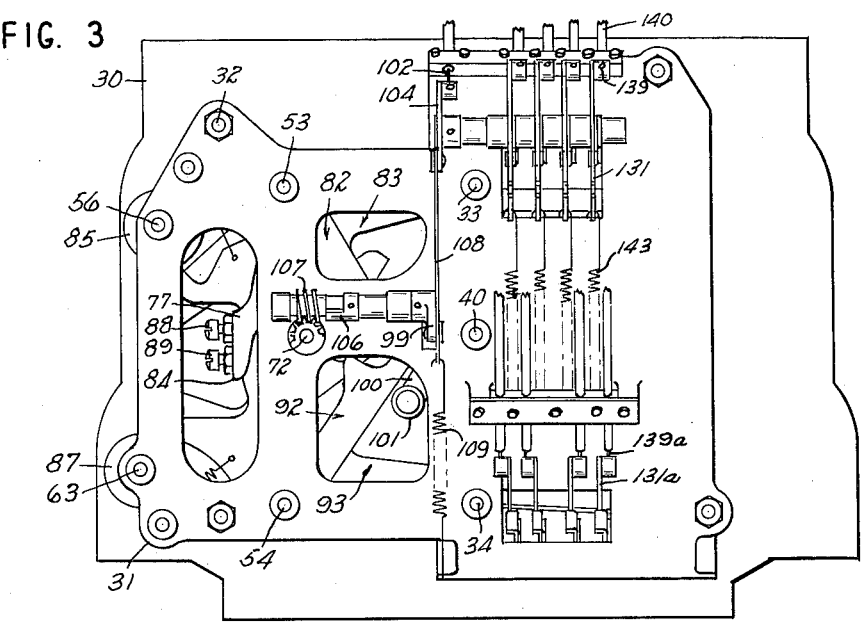
FIG. 3 is an enlarged side view of the preselector mechanism.
Figure 13:
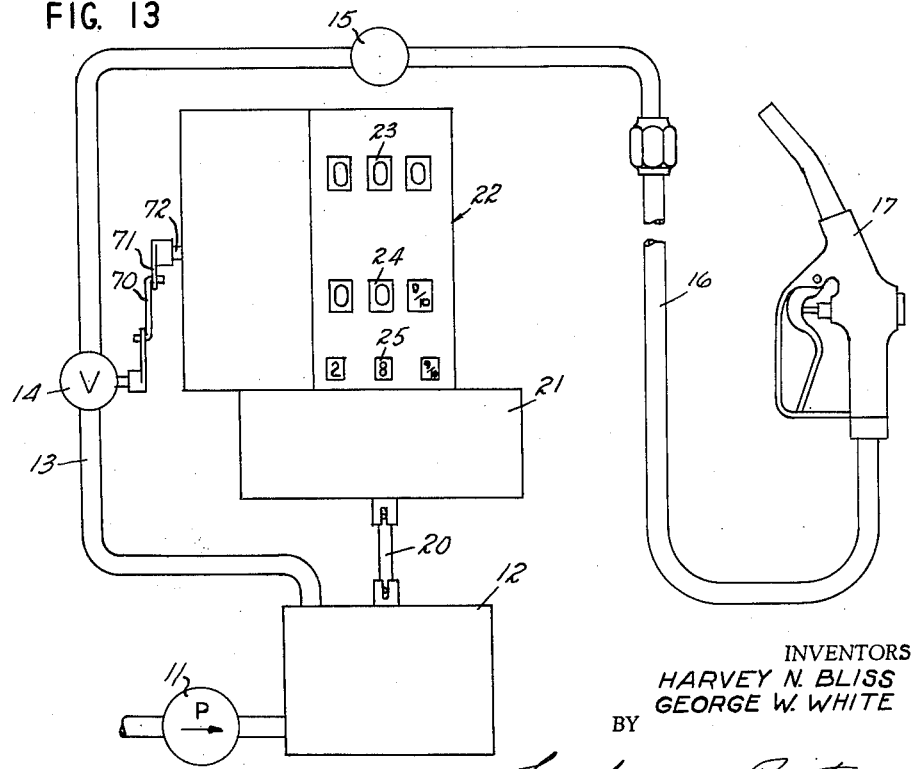
FIG. 13 is a diagrammatic view of a gasoline dispensing mechanism showing the valve and valve connections used in conjunction with the preselector mechanism.

Referring particularly to FIGS. 1, 2 and 13 of the drawings, the gasoline dispensing apparatus is shown mounted in a housing 10 and comprises an electrically driven pump 11 which draws the gasoline from a tank or reservoir (not shown) to the meter 12. The gasoline passing through the meter 12 is then conducted by pipe 13 through a valve 14 to visi-gage 15 and from thence to a flexible hose 16 having a conventional dispensing nozzle 17 at its outer end. Preferably, the nozzle 17 is of the type which can be latched in open position but will close automatically when the customer's gasoline tank is full to provide an added safety feature to take care of situations where the customer may order a larger quantity of gasoline than there is room in his tank.

The meter 12 has an output shaft 20 which is rotated in proportion to the amount of liquid dispensed and which is connected to a variator or speed change mechanism 21. The variator in turn is connected to a register 22 having a first set of numeral wheels 23 for registering the cost of the gasoline dispensed in dollars and cents and a second set of numeral wheels 24 for registering the quantity of the gasoline dispensed in gallons and tenths of gallons. The numeral wheels 25 indicate the price per gallon at which the variator has been set. The motor for driving the pump 11 is turned on and off by means of a switch (not shown) which is connected to an operating handle 26 on the exterior of the pump housing.

The Register

Figure 4:
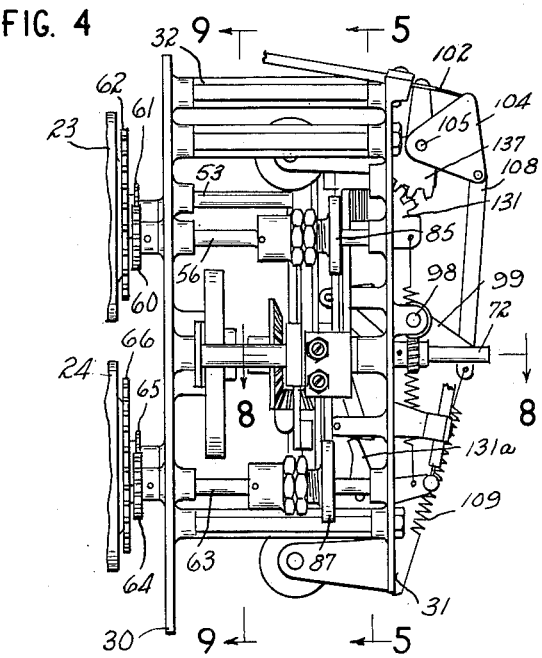
FIG. 4 is a fragmentary end view of the preselector mechanism.
Figure 8:
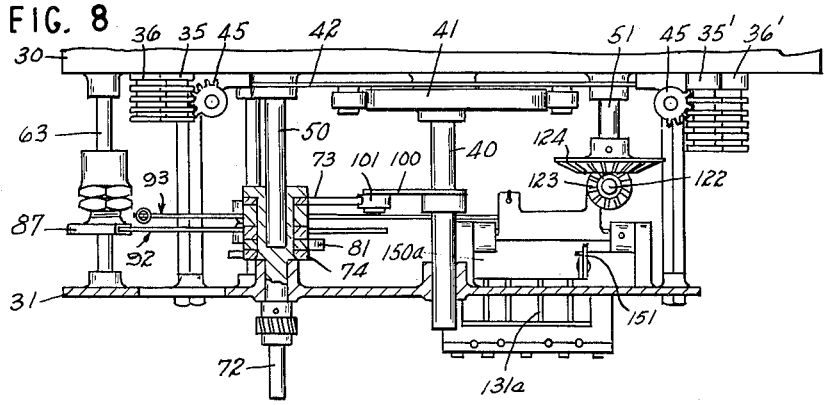
FIG. 8 is a fragmentary top view of the preselector mechanism with a portion thereof in cross-section taken along the line 8—8 of FIG. 4.
Figure 9:
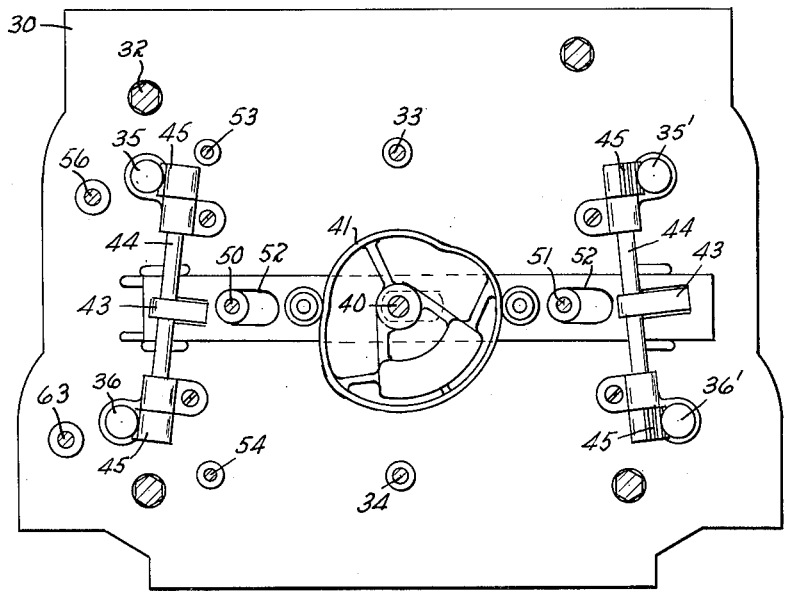
FIG. 9 is a cross-sectional view taken along the line 9—9 of FIG. 4.

For convenience of illustration, the preselector mechanism of the present invention has been shown in connection with a register of the type described and claimed in the Bliss Patent No. 2,814,444, granted November 26, 1957 and which is manufactured and sold commercially by the assignee, Veeder-Root, Inc. of Hartford, Connecticut. In the interest of brevity, the register 22 will be described here only to the extent required to explain its function in connection with the preselector mechanism of the present invention since the details of the register can be ascertained, if desired, by reference to the aforesaid Patent No. 2,814,444. As previously mentioned, the register 22 has a first set of numeral wheels 23 for registering the cost of the gasoline dispensed and a second set of numeral wheels 24 for registering the quantity of the gasoline dispensed. Although the same does not appear in the drawings, duplicate sets corresponding to the numeral wheels 23 and numeral wheels 24 are also mounted at the opposite end of the register. In FIG. 9 of the drawings, there is shown the side plate 30 of a standard commercial register of the type referred to which has been modified for the connection thereto of the preselector mechanism of the present invention. The preselector mechanism is mounted for the most part between this side plate 30 and an auxiliary plate 31 which is supported from the side plate 30 by means of the posts 32. Referring to FIG. 9, the shaft 33 shown in cross-section is an extension of a main drive shaft of the register which is rotated in proportion to the quantity of the gasoline dispensed. The shaft 34 is a similar extension connected to a main drive of the register which is rotated in proportion to the cost of the gasoline dispensed. The cost numeral wheels 23 are rotatably supported on a supporting shaft 35 while the corresponding set of cost numeral wheels at the opposite end of the register (not shown) are supported on the shaft 35'. The gallonage number wheels 24 are supported on the supporting shaft 36 while the duplicate set at the opposite end of the register (not shown) are supported on the shaft 36'. The center shaft 40 is the main control shaft of the register and is connected to the operating handle 26 previously referred to. The cam and slide mechanism mounted on the side plate 30 as shown in FIG. 9 may be ignored as far as the present invention is concerned. However, since they are shown in the drawing, it may be stated briefly that when the operator turns the handle 26 to the horizontal position to turn off the pump motor, he causes turning movement to be imparted to the cam 41 by reason of the shaft 40 to which the cam 41 is attached, which cam 41 moves the slide 42. The slide 42 by engagement with the arms 43 impart turning movement to the shafts 44 which are provided at their opposite ends with gear segments 45 meshing with the circularly grooved ends of shafts 35, 35', 36 and 36' so as to move the wheel supporting shaft axially and condition the register for a subsequent resetting operation. During a subsequent resetting operation, which is accomplished by means of a spring (not shown), rotational movement is imparted to the auxiliary reset shafts 50, 51 which extend through apertures 52 in the slide 42. The extensions 53 and 54 are connected to shafts of the register which have no function so far as the present invention is concerned and these extensions are merely used as supporting structures for the parts to be described hereinafter. The shaft 56 is best explained by reference to FIG. 4 which shows that the shaft 56 is a stub shaft extending through the side plate 30 and having a pinion 60 fixed to its inner end which meshes with a take-off gear 61 which is fixed to the driven gear 62 of the units wheel of the cost number wheels 23. Similarly, the stub shaft 63 extends through the side plate 30 and has a pinion 64 at its inner end meshing with a take-off gear 65 fixed to the driven gear 66 of the units wheel of the quantity number wheels 24. Thus the stub shafts 56 and 63 rotate in unison with the lowest number wheels during a dispensing operation and are returned therewith to original position during a resetting operation.

The Preselector Valve Actuating Mechanism

As previously mentioned, the function of the preselector mechanism is to actuate the valve 14 at the end of the delivery of the preselected amount or quantity of gasoline to thereby terminate the dispensing operation. For this purpose, the valve 14 is connected by connecting rod 70 to the arm 71 attached to a control shaft 72 which is telescopically supported on the end of the supporting shaft 50 previously referred to as extending outwardly from the side plate 30 of the register. The valve 14 is of the type which is biased to closed position. Fixed to the inner end of the control shaft 72 is a setting lever 73 by means of which the device may be cocked in a manner to be described more fully hereinafter. Also fixed to the inner end of the control shaft 72 is a keeper 74 having a pair of spaced shoulders 75 and 76 at different radial and angular positions. Shoulders 75, 76 are adapted to cooperate with a latch arm 77 which pivotally depends from the supporting shaft 53 and which is biased toward the keeper 74 by spring 78. When the latch arm 77 is engaged with the shoulder 75 or 76 it functions as a releasable means for holding the valve open. Also attached to the inner end of the control shaft 72 are a pair of stops 80, 81 each of which comprises a single promontory as best shown in FIG. 5.

The latch arm 77 is tripped in the case of a preselected delivery measured in terms of cost by a set of control members 82 and 83 and, in the case of a preselected delivery measured in terms of quantity, by the control members 92 and 93. The control members 92, 93 are respectively similar to control members 82, 83 except that they are mounted in an inverted position. The control members 82, 83 are pivotally mounted on supporting shaft 53 and control members 92, 93 are pivotally supported on the supporting shaft 54. Taking up first the control member 82, it will be seen that it is generally trident shaped and includes a central projecting trip finger 82a which underlies the latch arm 77 for engagement with the flange 84 thereof. The control member 82 also has a stop arm 82b which is adapted to cooperate with the stop 80 fixed to shaft 72 and a cam follower arm 82c angularly related thereto which is adapted to cooperate with the snail cam 85 which is attached to the shaft 56 previously described as being driven off the number wheel of lowest order of the cost number wheels 23 of the main register. The control member 82 is biased in a clockwise direction as viewed in FIG. 5 of the drawings by the spring 86. The control member 92 has a similar central projecting trip finger 92a for engagement with the flange 84 of the latch arm 77, a stop arm 92b adapted to cooperate with the stop 81 and a cam follower arm 92c adapted to cooperate with the snail cam 87 which is secured to the shaft 63 previously described as being driven by the number wheel of lowest order of the quantity number wheels 24 of the main register. The control member 92 is biased in a counter-clockwise direction as viewed in FIG. 5 by the spring 96.

The control member 83 is pivotally supported behind the control member 82 on the supporting shaft 53 and also includes a central projecting trip finger 83a which extends behind the rear of the latch arm 77 for engagement with a set screw 88 carried by the flange 84 of the latch arm 77. The control member 83 has a pair of angularly related arms consisting of a stop arm 83b and a follower arm 83c forming a follower by means of which the control member 83 is cam actuated as explained hereinafter. The control member 93, which is similarly mounted behind the control member 92 on the supporting shaft 54 also has a central projecting trip finger 93a cooperating with the set screw 89 on the flange 84 of the latch arm 77, a stop arm 93b and an elongated follower arm 93c. The control members 83 and 93 are biased in opposite directions by the spring 94 connected at opposite ends to the extensions 83d and 93d, respectively, the trip lever 83 being biased in a counter-clockwise direction and the trip lever 93 being biased in a clockwise direction as viewed in FIG. 5.

The configuration and relationship of control member 82 and control member 83 are such that, when the follower or actuating arm 83c is moved downwardly by a tripping mechanism to be described more particularly hereinafter, the projecting finger 83a moves the latch arm 77 outwardly a sufficient distance to clear the shoulder 75 on the keeper 74 so that the control shaft 72 is released for rotational movement in a direction permitting the valve 14 to move in a closing direction. Similarly, with respect to control members 92, 93 when the actuating arm 93c is moved upwardly by the tripping mechanism, the projecting finger 93a moves the latch arm 77 outwardly to clear the shoulder 75. Only partial closing movement is permitted, however, because the latch arm 77 re-engages upon the succeeding shoulder 76 on the keeper 74. This reduces the rate of fluid delivery prior to final shut-off which is a desirable feature in mechanisms of this type because it reduces momentum and thus increases accuracy at final shut-off.

Figure 12:
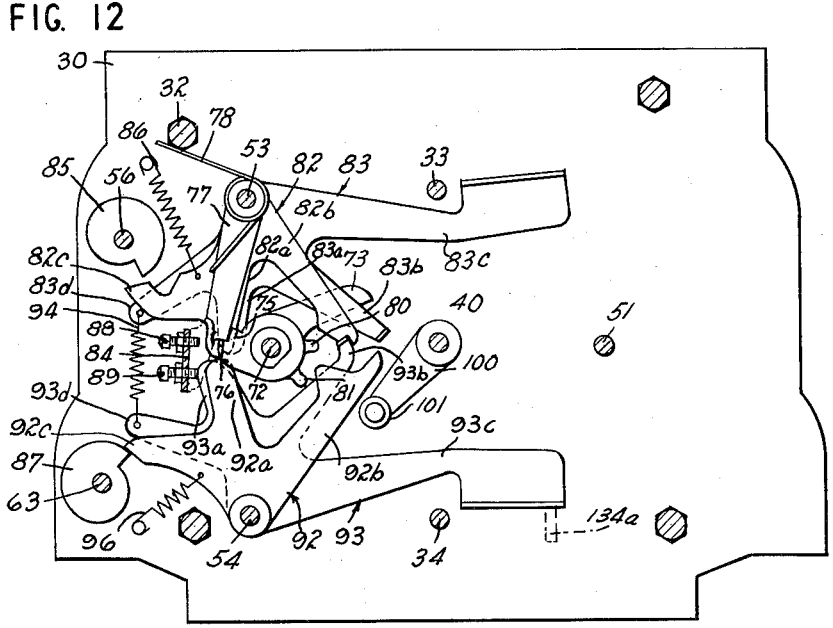
FIG. 12 is a view similar to FIG. 5 with the trip cam mechanism removed and showing the valve control mechanism in its first tripped position.

Upon movement of the control shaft 72 in a closing direction, the stops 80, 81 on the control shaft 72 move out of blocking position with respect to the stop arms 82b, 92b of the control members 82 and 92, respectively, releasing the control members 82, 92 for movement under the influence of springs 86, 96. However, upon initial pivoting movement of control member 83 only the associated control member 82 is free to move while upon initial pivoting movement of control member 93 only control member 92 is free to move. The reason for this is that when control member 83 is moved to tripped position, the flanged end of its stop arm 83b will move in front of the stop arm 92b of control member 92 to latch control member 92 in its original position and if control member 93 is tripped first, the flanged end of its stop arm will move in front of the stop arm 82b of control member 82. This latter condition has been illustrated in FIG. 12 of the drawings where it will be noted that the tripped control member 93 has latched control member 82 in original position and hence only the control member 92 has been released. Control member 92 under the influence of spring 96 has turned in a counterclockwise direction to a position such that the end of its follower arm 92c abuts against and engages the snail cam 87. The snail cam 87 is being rotated by the number wheel of lowest order of the gallonage number wheels 24 and is adjusted in timed relationship so that when the control member 92 is released, the cam follower arm 92c will fall on the large diameter portion of the cam and then subsequently will drop off the step to the small diameter of the cam when the main register reaches the exact gallonage reading selected. When the cam follower arm 92c falls off the step of the large diameter portion to the small diameter portion of the snail cam 87, the control member 92 is allowed to pivot an additional amount under the influence of spring 96 in a counter-clockwise direction as viewed in FIG. 5 causing the projecting finger 92a which engages against the flange of latch arm 77 to move the latch arm 77 outwardly sufficient to clear the shoulder 76 of the keeper 74 which in turn releases the control shaft 72 and permits the valve 14 to fully close. The function of the control member 82 is similar to that of the control member 92 except that when it is released it engages with snail cam 85 which in turn is driven off the number wheel of lowest order of the set of cost wheels 23 of the register. As explained more fully hereinafter, the control members 82 and 83 are used to trip the valve when the preselector has been set to terminate the dispensing operation upon delivery of a preselected cost of gasoline and the control members 92, 93 are used to trip the valve when the preselector has been set to terminate the dispensing operation upon delivery of a preselected volume of gasoline.

As previously mentioned, the control shaft 72 may be moved to cocked position to open the valve 14 to condition the apparatus for a subsequent dispensing operation by means of the setting lever 73 which is adapted to be engaged by a cocking lever 100 which is attached to the main shaft 40 of the register 22. As previously explained, the main shaft 40 of the register 22 is connected to the exterior operating handle 26 and the arrangement is such that, when the handle 26 is turned to a horizontal position to shut off the pump motor, the roller 101 on the cocking lever 100 will engage against the setting lever 73 which is fixed to the inner end of control shaft 72 and thus turn the control shaft 72 to the cocked position shown in FIG. 5 in which position the stops 80, 81 by engagement with stop arms 82b, 92b retract the control members 82, 92 and permit the latch arm 77 to re-engage with the shoulder 75 of the keeper 74. The control shaft 72 also may be moved to the cocked position if desired by means of a flexible cable 102 having a pull ring 103 at its outer end situated at the exterior of the side wall of the housing 10 and which cable extends and is connected to a lever 104 secured to a stub shaft 105 rotatably supported on the plate 31. The lever 104 is connected by a link 108 to arm 99 fixed to a second stub shaft 98 rotatably supported on plate 31. The opposite end of the stub shaft 98 is provided with a coupling 106 for turning a worm 107 which meshes with a pinion secured to the control shaft 72. Thus when the cable 102 is pulled outwardly by the operator utilizing the pull ring 103, the worm 107 is turned in a direction to rotate the control shaft 72 to a position where it is latched in cocked position by the latch arm 77 engaging the shoulder 75. The cable 102 upon release is returned to original position by the spring 109. Because of the one-way coupling 106, there is no interference with the operation of the cocking lever 100 when the latter is used to cock the mechanism.

*The Preselector Tripping Mechanism*

Figure 10:
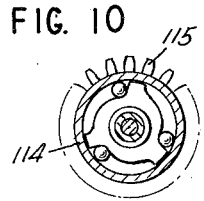
FIG. 10 is a cross-sectional view of the clutch in the cylinder cam drive shown in FIG. 5.

The control members 83 and 93 are adapted to be tripped by the predetermining portion of the mechanism shown at the right-hand side of FIG. 5 of the drawings and shown in detail in FIGS. 3, 4, 6 and 7. Extending across the top of the apparatus and rotatably mounted on stanchions 110 extending inwardly from the plate 31 is a cam supporting shaft 111. Mounted on the cam supporting shaft 111 is a cam comprising the cylinder 112 formed with camming surfaces or promontories 113 which are spaced both axially and circumferentially of the cylinder. The cylinder 112 and promontories 113 may be made as a single unit although, for simplicity of fabrication, they may be made of separate elements which are secured together in any suitable manner into a unitary structure. The cylinder 112 with its promontories 113 is connected to and rotated through a one-way clutch 114 shown in detail in FIG. 10 of the drawings. The drive or gear portion 115 of the clutch 114 is in mesh with a worm 116 which is secured to the main drive shaft 33 of the register 22 which is, as previously described, rotated in relation to the cost of the liquid dispensed. Thus the cylinder 112 and promontories 113 are also rotated in relationship to the cost of the liquid dispensed. The promontories 113 are spaced apart circumferentially, i.e., angularly, at distances corresponding to the various units of cost to be preselected by the apparatus as will be explained more fully hereinafter. The direction of rotation of cylinder 112 is clockwise as viewed in FIG. 7.

Figure 11:
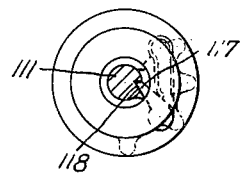
FIG. 11 is an end view of the cylinder cam of FIG. 5 with the shaft in cross-section.

The cylinder 112 carries a conventional pivoted pickup pawl 117 extending through an aperture in the hub as best shown in FIG. 11 which is arranged to cooperate with a longitudinal groove 118 in the supporting shaft 111. As a result of this construction, the cylinder 112 may be advanced by the driving mechanism described above while the shaft 111 remains stationary, but when the shaft 111 is rotated in the same direction to reset the cylinder, the groove 118 will pick up the pawl 117 and advance the cylinder to original position. The turning of the shaft 111 to accomplish resetting of the cylinder 112 is accomplished by means of a bevel gear 120 fixed thereto which meshes with a bevel gear 121 on the upper end of a shaft 122 which, in turn, is driven by a bevel gear 123 fixed thereon, which meshes with a bevel gear 124 which is secured to the reset shaft 51 of the register 22 previously described. As a result of this construction, the resetting of the register 22 which is accompanied by turning of reset shaft 51 will cause the simultaneous resetting of the cylinder 112.

As best shown in FIG. 7 of the drawings, the outer end of the arm 83c of the control member 83 has a flange 130 which is disposed parallel and adjacent the cylinder 112. The arm 83c engages against a stop (not shown) limiting movement toward the cam cylinder 112 so that in the normal operation of the device, the flange 130 is spaced from and will not be engaged by the promontories 113 during rotation of the cylinder 112. In order to condition the apparatus so that it will actuate the trip arm 83c by one of the promontories 113, there is provided a series of identical selector levers 131 pivotally mounted on a supporting shaft 132, one selector lever 131 being provided for each of the promontories 113 and being mounted in radial alignment therewith. Carried on each of the selector levers 131 is a pivoted roller arm 133 on which is mounted a roller 134. The arm 133 and its roller 134 are biased to the position shown in FIG. 7 by reason of the spring 135. Each of the selector levers 131 is formed with an arcuate rack 136 along one edge which meshes with a gear segment 137 pivotally supported on the shaft 105. The gear segments 137 are secured at their other ends to wires 139, carried in protective sheaves 140, which extend across the upper portion of the housing 10 for connection to push-buttons 141 which preferably have inscribed thereon indicia showing the cost of the liquid to be dispensed which may be preselected by pushing in the selected button 141.

When the desired push button 141 is pushed inwardly to preselect the cost of the gasoline to be dispensed, the wire 139 connected thereto actuates the associated gear segment 137 to pivot the selector lever 131 to dispose the roller 134 thereof between the flange 130 of the trip arm 83 and the path of travel of the corresponding promontory 113 on the cylinder 112. Thus just shortly before the selected value of gasoline has been dispensed, the corresponding promontory 113 will engage the roller 134 and through this depress the outer end of the trip arm 83 causing release of the valve control shaft 72 as previously described.

The arrangement for tripping the trip arm 93c is similar. Disposed on the supporting shaft 111a is a cam comprising cylinder 112a having camming surfaces or promontories 113a which are axially spaced and angularly related in relation to the quantities of gasoline which are to be preselected. The cylinder 112a is driven through a one-way clutch 114a by the gear 115a in mesh with worm 116a which is secured to the outer end of the shaft 34 of the main register 22 which as previously described is rotated in proportion to the quantity of gasoline dispensed. The direction of rotation of cylinder 112a is counter-clockwise as viewed in FIG. 7. The resetting of the cylinder 112a is accomplished in the same manner as the resetting of cylinder 112 which is to say that the shaft 111a has a longitudinal groove therein which is designed to engage a pickup pawl to return the cylinder 112a to the original position when the shaft 111a is rotated. The shaft of 111a has fixed thereto a bevel gear 120a meshing with a bevel gear 121a which is fixed to the shaft 122a previously described and which is driven by the reset shaft 51 of the main register.

The slector levers 131a are similar to the selector levers 131 except that the wires 139a are connected directly thereto as at 142 rather than by a gear segment and rack arrangement as described in connection with the selector levers 131. Also, the springs 135 are omitted since the rollers 134a and supporting levers 133a are sufficiently biased by gravity. The selector levers 131 and 131a are biased to the inactive or at rest position shown in FIG. 7 by means of the interconnecting spring 143.

The tails of the selector levers 131, 131a opposite the rollers 134, 134a bear against pivotally mounted holding plates 150, 150a interconnected by the link 151. The upper holding plate 150 is fixed to a rotatably mounted shaft 154 while lower plate 150 is rotatably supported by shaft 155. The holding plates 150, 150a are biased to the position shown in FIG. 7 by the spring 152. As a result of this construction, when a selected push button 142, 142a is depressed, the corresponding selector lever 131, 131a is rotated so that the tail of the lever engages behind the associated holding plate 150, 150a and thus is latched in operative position. In the event that a second button is pushed in, after one of the other buttons has been depressed to engage a corresponding lever 131, 131a behind one of the holding plates 150, 150a, the previously engaged selector lever 131, 131a will be released due to the pivoting action imparted to the plates 150, 150a upon the depression of the second button. Also, it will be noted that there is a cam 153 secured to the shaft 122 which has a promontory 153a thereon which will engage against and pivot the holding plate 150a and through the link 151 the upper plate 150 during a resetting operation so as to release any selector lever which might have been previously set in operative position.

Provision is also made to release any selector lever 131, 131a engaged by the holding plates 150, 150a in the event that the operator pulls the release cable 102 by means of the pull ring 103. The release of the holding plates 150, 150a is accomplished by the nose 99a on the lever 99 which is adapted to bear against a crank 156 which is fixed to the shaft 154. Thus when the ring 103 and attached cable 102 are pulled, the lever 99 is pivoted to engage against the crank 156 which in turn pivots the holding plates 150, 150a and releases any lever 131, 131a which may have been previously engaged.

*Operation*

It is believed that the operation of the described embodiment of the present invention will be apparent from the above description taken in connection with the following explanation. Assuming that the operator wishes to perform a dispensing operation and the main register 22 has been reset to zero position and the pump motor is turned off, the operator will first turn on the pump motor which he will accomplish by moving the handle 26 from the horizontal to the vertical position. Under these conditions, the valve 14 is open and the operator may dispense gasoline in the usual manner by operating the hose nozzle 17 without making any use of the preselecter mechanism if he so desires. If he wishes to use the preselector mechanism, he merely has to push in the desired button 141 or 141a designating the preselected volume or cost of the gasoline which he wishes to dispense. It is an advantage of the present mechanism that he may do this either before he turns on the pump motor or afterwards and, in fact, he can do this even after he has commenced a dispensing operative provided that the volume or cost designated by the push button selected is greater than the amount or cost of the gasoline already dispensed.

As previously explained, the depression of a selected button 141 will pivot the corresponding selector lever 131 so that the roller 134 on the lever 133 carried thereby is moved into position between the flange of trip arm 83c and the path of travel of the corresponding promontory 113, the selected lever 131 being held in this position by the holding plate. As the dispensing operation proceeds, the promontory 113 corresponding to the push button which was actuated will revolve until it engages against the roller 134 of the selector lever 131 causing depression of the outer end of the trip arm 83c. The promontories 113 are located so that they will trip the trip arm 83c slightly in advance of the exact quantity or value of gasoline preselected for delivery. In the case of the selection of a preselected quantity of gasoline, the tripping preferably occurs at approximately one-fifth gallon before the exact quantity is fully dispensed. In the case of a preselected value, the tripping preferably occurs at approximately five (5) cents before the selected value has been dispensed.

When the trip arm 83a is tripped in the manner just described, the resulting pivoting movement of control member 83 by reason of the trip finger 83a trips the latch 77 and thus releases the control shaft 72 for partial rotational movement sufficient to partially close the valve 14 so that thereafter the dispensing takes place at a greatly reduced rate. The associated control member 82, which also has been released by the partial rotation of the control shaft 72 now engages its follower arm 82c against the snail cam 85 and when the snail cam rotates to a position to permit the arm 82c to drop off the large diameter portion, the control member 82 through its trip finger 82a performs the final tripping of latch 77 and the control shaft 72 is released to turn the remaining distance to completely close the valve 14 and thus terminate the dispensing operation. The snail cam 85 is rotatably positioned so that the corresponding control plate 82 will fall off the high portion of the cam at the precise moment when the preselected quantity or value of gasoline has been dispensed. The valve is thus closed in a stepwise fashion by use of a first pair of cams 85, 112 which are driven in proportion to the cost of the liquid dispensed.

In the event that the customer changes his mind at this point, the operator may condition the apparatus for additional dispensing merely by pulling the release cable 102 by means of the pull ring 103. As previously explained, this actuation of the cable 102 through the coupling 106 and worm 107 returns the control shaft 72 to cocked position reopening the valve 14 and also pivots the plates 150, 150a to release the selector levers 133, 133a. The operator can thereupon continue dispensing in the usual manner or he may select a push button of higher value or quantity of gasoline to reset the mechanism for automatic stopping at the completion of dispensing of the newly selected quantity or value of gasoline.

At the completion of the dispensing operation, the operator will close the hose nozzle and then turn off the pump motor by returning the handle 26 to the horizontal position. As previously described, turning handle 26 imparts rotational movement to the shaft 40 which pivots the cocking lever 100 and resets the control shaft 72 to cocked position reopening the valve 14. This is a particular advantage of the mechanism since the opening of the valve 14 re-establishes the flow path to the hose 16 and causes it to assume its normally dilated condition thus assuring accuracy in the subsequent dispensing operation.

Before the operator can undertake a subsequent dispensing operation, because of the interlock mechanism present in the register, it is necessary for him to clear or reset the main register 22. This is accomplished in connection with the register 22 by pushing the reset button 160 which causes the register to reset under the influence of a resetting spring (not shown). The resetting of the main register 22 causes rotation of the reset shaft 51 which, as previously described, is geared to the shaft 122 which in turn rotates shafts 111, 111a thus returning the cylinders 112, 112a to original starting position. The resetting operation also releases any of the selector levers 131, 131a which may have been originally moved to operating position. The resetting of the number wheels of the register also causes the snail cams 85, 87 to be reset to original position. This completes the cycle of operation and the operator can now turn on the pump motor and perform a dispensing operation in the manner described above. To simplify the description of the operation of the device, it has been assumed above that one of the push buttons 141 was depressed. If instead, one of the push buttons 141a were depressed, then of course a selector lever 133a would have been moved into operating position to cause a promontory of cylinder 112a to trip the trip arm 93c, whereupon the control members 92, 93 would have effected the stepwise closing of the valve 14 in a similar manner. In that event, the valve would be closed in stepwise fashion by use of the second pair of cams 87, 112a which are driven in proportion to the volume of liquid dispensed.

*Modified Preselector Tripping Mechanism*

Figure 14:
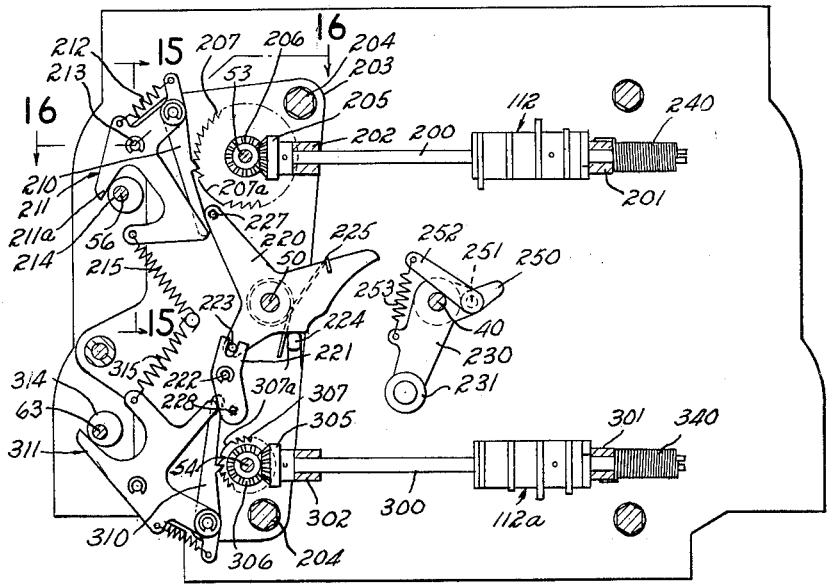
FIG. 14 is a side view of a modified driving and resetting mechanism for the trip cams of the preselector mechanism.
Figure 15:
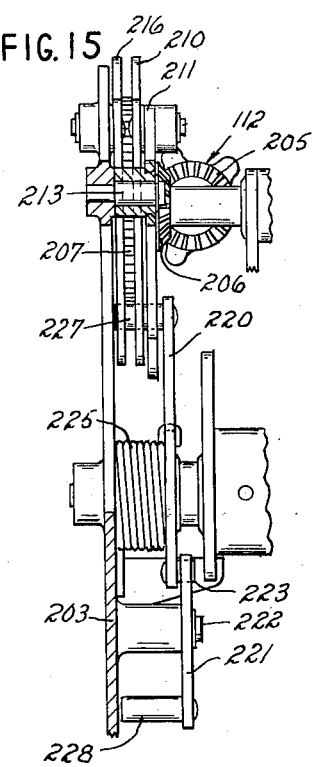
FIG. 15 is a fragmentary cross-sectional view taken along the line 15—15 of FIG. 14.
Figure 16:
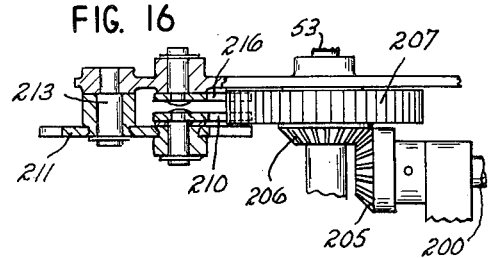
FIG. 16 is a fragmentary cross-sectional view taken along the line 16—16 of FIG. 14.

In FIGS. 14, 15 and 16 of the drawings, there is shown a simplified arrangement for driving and resetting the cylinders 112, 112a. Since the preselector valve actuating mechanism is the same as in the first embodiment and overlies the driving and resetting mechanism, it has been omitted from FIGS. 14, 15 and 16 to simplify the description.

The cylinder 112 is fixed to a shaft 200 for rotation therewith, the shaft 200 being rotatably journaled in bearings 201, 202. The bearing 202 is carried by an auxiliary mounting plate 203 supported on the side plate 30 of the register by posts 204. The cylinder 112a is similarly fixed to shaft 300 rotatably journaled in bearings 301, 302. Shaft 200 is adapted to be rotated by the bevel gear 205 fixed thereto and meshing with bevel gear 206 fixed to ratchet wheel 207 for rotation therewith, the bevel gear 206 and ratchet wheel 207 being rotatably supported on shaft 53. Shaft 300 is adapted to be rotated by bevel gear 305 fixed thereto and meshing with bevel gear 306 fixed to ratchet wheel 307 for rotation therewith, the bevel gear 306 and ratchet wheel 307 being rotatably supported on shaft 55.

Ratchet wheel 207 is driven by a pawl 210 pivotally supported on a cam follower 211 and biased toward the ratchet wheel by spring 212. The cam follower 211 is mounted for oscillatory movement on pivot pin 213 and has a follower arm 211a riding on an eccentric cam 214 fixed to stub shaft 56 which, as previously described, is rotated by the number wheel of lowest order of the set of cost number wheels 23. Thus during a registering or dispensing operation, the eccentric cam 214 is rotated in accordance with rotation of the cost number wheels and the cam 214 by oscillating the cam follower 211, imparts a proportionate turning movement to shaft 200 and cylinder 112 by means of ratchet pawl 210 and ratchet wheel 207. In a similar manner, rotational movement is imparted to shaft 300 and cylinder 112a proportionate to the cost of the liquid dispensed by the eccentric cam 314 fixed to stub shaft 63 and cooperating with the oscillating follower 311 carrying the pawl 310 for actuating the ratchet wheel 307. The followers 211, 311 are biased toward the respective cams 214, 314 by the springs 215, 315. A land on each of the ratchet wheels 207, 307 denoted at 207a and 307a, respectively, insures that the ratchet wheels 207, 307 will not turn more than one revolution. A no-back pawl 216 pivotally supported on plate 203 is provided for engagement with ratchet wheel 207, as best shown in FIG. 16. A similar no-back pawl (not visible in the drawings) is provided for engagement with ratchet wheel 307.

In order to reset the mechanism, there is provided a pair of levers 220, 221 pivotally supported on shaft 50 and on a pivot pin 222, respectively. The levers 220, 221 are interengaged by a pin and slot connection indicated at 223 and are biased to the position shown in FIG. 14 with lever 220 engaging the stop 224 by a spring 225. The lever 220 carries a roller 227 adapted to engage the pawls 210, 216 when the levers are pivoted and disengage the pawls from the ratchet wheel 207. Similarly, the lever 221 carries a roller 228 for disengaging the pawl 310 and associated no-back pawl from the ratchet wheel 307. The levers 220, 221 are adapted to be pivoted by the cocking lever 230 which is similar to the cocking lever 100 previously described in that it is attached to the main shaft 40 of the register for operation by the handle 26 and carries a roller 231 which in addition to actuating the lever 220 also engages and cocks the preselector valve actuating mechanism previously described.

When the pawls are disengaged from the ratchet wheels 207, 307 as just described, the cylinders 112, 112a and associated gear trains are returned to original position by the reset coil springs 240, 340. Reset spring 240 is connected at one end to shaft 200 and at the other end to the stationary bearing 201. Thus it is loaded as shaft 200 is turned during a dispensing operation and is able to restore the cylinder 112, shaft 200, gears 205, 206 and ratchet wheel 207 to original position when the pawls 210, 216 are released. Similarly, the spring 340 connected at one end to shaft 300 is loaded during a dispensing operation and returns the cylinder 112a and shaft 300 with its driving gear train to initial position upon release of the pawls. Suitable stops, not shown, may be utilized to fix the initial position of cylinders 112, 112a on resetting.

The cocking lever 230 has associated therewith a release detent 250 which is fixed to a rotatable pivot 251 having an arm 252 fixed to the opposite end which is connected by spring 253 to the cocking lever 230. The normal position of detent 250 is as shown in FIG. 14 by reason of the engagement of arm 252 with shaft 40. The detent 250 is adapted to engage the holding plate 150 during a cocking operation and pivot the same to release the push buttons. The pivotal mounting of detent 250 permits overtravel thereof with respect to plate 150 since on the return movement it will yield and thus not catch thereon.

It thus will be seen that there has been provided in accordance with the invention, a preselector mechanism for use with associated apparatus such as gasoline dispensing apparatus, which has many advantages from the standpoint of convenience and ease of operation, which provides a desired versatility and utility of function to meet the needs of commercial requirements, and which affords many economies and benefits from the standpoint of fabrication, assembly and use. Since the invention will be susceptible of variation and modification by one skilled in the art in the light of the above description, all such variations and modifications are intended to be included within the scope of the invention.

We claim:

1. A liquid dispensing apparatus having automatic means for terminating a dispensing operation comprising a register having driving means and resetting means, a shut-off valve in the liquid flow line of the dispensing apparatus, a valve control member connected to the shut-off valve, a pair of latching shoulders on the valve control member, a releasable latch engageable with the shoulders in sequence, a first pair of cams driven by the register in proportion to the cost of liquid dispensed, a first tripping means for the latch actuatable by the first pair of cams in sequence, a second pair of cams driven by the register in proportion to the volume of liquid dispensed, second tripping means for the latch actuatable by the second pair of cams in sequence, manually operable selector means for conditioning the first and second tripping means for actuation by the cams, and means for resetting the register and cams to original position.

2. A liquid dispensing apparatus having automatic means for terminating a dispensing operation comprising a register having means for registering the cost and volume of the liquid dispensed, a shut-off valve in the liquid flow line of the dispensing apparatus, a pump motor switch, a valve control member connected to the shut-off valve, latching means for latching the valve control member in a first position with the valve fully open and a second position with the valve partially open, a first pair of cams driven by the register in proportion to the cost of the liquid dispensed, first tripping means for the latching means actuatable by the first pair of cams in sequence, a second pair of cams driven by the register in proportion to the volume of liquid dispensed, second tripping means for the latching means actuatable by the second pair of cams in sequence, manually operable means for conditioning one of the first and second tripping means for actuation by the cams, means for resetting the register and cams to starting position, and means for simultaneously moving the valve control member to first position and opening the pump motor switch.

3. A liquid dispensing apparatus having automatic means for terminating a dispensing operation comprising a shut-off valve in the liquid flow line of the dispensing apparatus biased to closed position, a valve control member connected to the shut-off valve, latching means for latching the valve control member in a first position with the valve fully open and a second position with the valve partially open, a pair of cams driven by the register during a dispensing operation, one of said cams having a plurality of actuating means formed thereon at spaced angular positions, tripping means for the latching means including followers associated with the pair of cams, and push button operated means for conditioning one of the followers for actuation by a selected actuating means of the said one of the cams.

4. A liquid dispensing apparatus having automatic means for terminating a dispensing operation, comprising a register having driving means, a shut-off valve in the liquid flow line of the dispensing apparatus, a pair of cams driven by the register, a valve control member connected to the shut-off valve and having a pair of spaced shoulders, a latch engageable with said shoulders in sequence, a first trip member actuated by one of the cams for releasing the latch from the first of said shoulders, and a second trip member actuated by the other of the cams for releasing the latch from the second of said shoulders.

5. A liquid dispensing apparatus having automatic means for terminating a dispensing operation comprising a register having driving means, a shut-off valve in the liquid flow line of the dispensing apparatus, a rotatable valve control member connected to the shut-off valve having angularly related shoulders, a latch engageable with said shoulders to hold the control member in valve full open and valve partially open positions, a pair of rotatable cams driven by the register, a first tripping member for the releasing of the latch actuated by one of the cams, means for varying the amount of rotation of said one of the cams required to actuate the first tripping member, and a second tripping member for releasing the latch actuated by the other of said cams.

6. In a pre-settable control apparatus for liquid dispensing mechanisms of the type having flow inducing means, a register having driving means, and a shut-off connected to the shut-off valve and adapted to be tripped to permit the valve to close, tripping means driven by the register for releasing the control member, and means for simultaneously stopping the flow inducing means and moving the control member to valve open position.

7. In a pre-settable control apparatus for liquid dispensing mechanisms of the type having flow inducing means, a register provided with driving and resetting means, and a shut-off valve, the combination comprising a pair of trip members adapted to be driven by the register, a control member for connection to the shut-off valve, means operated sequentially by the trip members for releasing the control member, and means for simultaneously stopping the flow inducing means and opening the shut-off valve.

8. In a pre-settable control apparatus for liquid dispensing mechanisms of the type having a pump motor, a pump motor switch, a register provided with driving and resetting means, and a shut-off valve, the combination comprising a trip member adapted to be driven by the register, a control member for connection to the shut-off valve, means operated by the trip member for releasing the control member, and means for actuating the pump motor switch including means for opening the shut-off valve when the pump motor switch is opened.

9. In a pre-settable control apparatus for liquid dispensing mechanisms of the type having a pump motor switch, a register having driving means, and a shut-off valve biased to closed position, the combination comprising a control member connected to the valve, a latch for retaining the control member in valve open position, tripping means for the latch driven by the register, and means connected to the pump motor switch and the control member for simultaneously opening the pump motor switch and moving the control member to valve open position.

10. In a pre-settable control apparatus for liquid dispensing mechanisms of the type having a shut-off valve and a register provided with driving means, the combination comprising a valve control member, tripping mechanism for releasing the valve control member, a plurality of actuators driven in unison by the register for actuating the tripping mechanism at different predetermined readings of the register, and push button operated means for conditioning the tripping mechanism for operation by a selected one of the actuators.

11. In a pre-settable control apparatus for liquid dispensing mechanisms of the type having a shut-off valve and a register provided with driving means, the combination comprising a valve control member, tripping mechanism for releasing the valve control member, a plurality of camming surfaces driven in unison by the register, said camming surfaces being spaced for actuating the tripping mechanism at different predetermined readings of the register, means for resetting the camming surfaces to a predetermined initial position prior to a dispensing operation, and push button operated means for conditioning the tripping mechanism for actuation by a selected one of the camming surfaces.

12. In a presettable control apparatus for liquid dispensing mechanisms of the type having a shut-off valve and a register provided with driving means, the combination comprising a plurality of camming surfaces driven by the register, means for resetting the camming surfaces to an initial position prior to a dispensing operation, a valve control member, tripping mechanism for releasing the valve control member including a follower for actuation by the camming surfaces, and push button operated means for inserting a connector between the follower and a selected camming surface.

13. In a pre-settable control apparatus for liquid dispensing mechanisms of the type having flow initiating means and a register provided with driving means, the combination comprising a control member connected to the flow initiating means and biased for movement in one direction, a latch for holding the control member against movement in said one direction, cam means having a plurality of camming surfaces driven by the register, said camming surfaces being spaced for actuating the tripping mechanism at different predetermined readings of the register, tripping mechanism for the latch including a follower for actuation by the cam means, and push button operated means for conditioning the follower for actuation by a selected camming surface.

14. In a pre-settable control apparatus for liquid dispensing mechanisms of the type having flow initiating means and a register provided with driving means, the combination of a cam having axially and circumferentially spaced actuating means, means for operating the flow initiating means including a follower extending generally parallel to the axis of the cam, a plurality of connectors movable selectively into position for transmitting movement from one of the cam actuating means to the follower, and push button means for moving a selected connector into operative position for transmitting movement from the cam to the follower.

15. An apparatus as defined in claim 14 wherein the plurality of connectors comprise a series of side-by-side pivoted levers, each carrying a roller for movement therewith into the orbit of one of the actuating means of the cam.

16. An apparatus as defined in claim 15 including releasable retaining means for holding the selected pivoted lever in operative position with its roller in the orbit of the cam actuating means, and means for releasing the releasable retaining means responsive to pivoting movement of one of the other levers.

17. In a pre-settable control apparatus for liquid dispensing mechanisms of the type having a shut-off valve and a register provided with driving means, the combination of a valve control member connected to the shut-off valve, releasable means for holding the valve control member in valve open position, means for releasing the releasable means including a cam driven by the register, and means for simultaneously resetting the cam and restoring the valve control member to valve open position.

18. In a pre-settable control apparaus for liquid dispensing mechanisms of the type having a shut-off valve and a register provided with driving means, the combination comprising a valve control member, tripping mechanism for releasing the valve control member, a first tripping member for actuating the tripping mechanism driven by the driving means of the register, and a second tripping member for actuating the tripping mechanism connected to and driven by the lowest order number wheel of the register.

19. In a pre-settable control apparatus for liquid dispensing mechanisms of the type having flow control means and a register having driving means, the combination comprising a control member connected to the flow control means, means for actuating the control member including a cam and a cam follower, means for rotating the cam including an eccentric driven by the register, and a reset spring for the cam which is loaded responsive to movement of the cam.

20. In a pre-settable control apparatus for liquid dispensing mechanisms of the type having a shut-off valve and a register, the combination of a valve control member, tripping mechanism for releasing the valve control member, means for actuating the tripping mechanism including a cam, means for driving the cam including an eccentric driven by the register, and means for simultaneously resetting the cam to original position and moving the valve control member to valve open position.

21. In a pre-settable control apparatus for liquid dispensing mechanisms of the type having flow control means and a register having number wheels of different order and means for driving and zeroizing the number wheels, the combination therewith of a releasable control member connected to the flow control means, an eccentric driven by the number wheel of lowest order, a first cam having driving means responsive to movement of the eccentric, a reset spring connected to the first cam, a second cam driven by the number wheel of lowest order and resettable therewith, and means for releasing the control member responsive to movement of the first and second cams.

22. In a pre-settable control apparatus for liquid dispensing mechanisms of the type having a shut-off valve and a register provided with driving means, the combination comprising releasable means for holding the valve in open position, means to release the releasable means including a cam follower, a rotatable cam for actuating the cam follower, means for connecting the rotatable cam to the driving means of the register and for disconnecting the cam therefrom, and a reset spring connected to the cam which is loaded when the cam is driven by the register and which resets the cam when the cam is disconnected from the register.

23. In a pre-settable control apparatus for liquid dispensing mechanisms of the type having flow initiating means, a shut-off valve biased to closed position, and a register having number wheels of different order and means for driving and zeroizing the number wheels, the combination therewith of a control member connected to the shut-off valve, a latch for holding the control member in a first position with the valve fully open and a second position with the valve partially open, first tripping means for the latch comprising an eccentric driven by the number wheel of lowest order, a first cam having a disconnectible drive responsive to movement of the eccentric, a reset spring for the first cam and connected thereto for loading during movement of the first cam, and a follower for the first cam, second tripping means for the latch comprising a second cam driven by the number wheel of lowest order and resettable to original position therewith, and a follower for the second cam, and means for simultaneously moving the control member to its said first position and disconnecting the drive of the first cam.

24. A liquid dispensing apparatus having automatic means for terminating a dispensing operation comprising a register having means for registering the cost and volume of the liquid dispensed, a shut-off valve in the liquid flow line of the dispensing apparatus biased to a closed position, a rotatable valve control member connected to the shut-off valve, a releasable latch engageable with the valve control member to hold the member in a first position with the valve fully open and in a second position with the valve partially open, a first pair of cams driven by the register and each having a plurality of spaced promontories, one of said pair of cams being driven at a rate proportional to the cost of the liquid dispensed and the other being driven at a rate proportional to the volume of the liquid dispensed, a pair of initial trip members for the latch, each associated with one of the cams, means for conditioning one of the initial trip members for actuation by a selected promontory of its associated cam, an auxiliary pair of cams driven by the register, one of said auxiliary pair of cams being driven at a rate proportional to the cost of the liquid dispensed and the other being driven at a rate proportional to the volume of liquid dispensed, a pair of auxiliary trip members for the latch each associated with one of the auxiliary pair of cams, and means responsive to initial movement of the valve control member in a valve closing direction for releasing one of the auxiliary trip members for actuation by an auxiliary cam.

25. A liquid dispensing apparatus having automatic means for terminating a dispensing operation comprising a register having means for registering the cost and volume of the liquid dispensed, a shut-off valve in the liquid flow line of the dispensing apparatus biased to a closed position, a rotatable valve control member connected to the shut-off valve, a releasable latch engageable with the valve control member to hold the member in a first position with the valve fully open and in a second position with the valve partially open, a first pair of cams driven by the register and each having a plurality of spaced actuating portions, one of said pair of cams being driven at a rate proportional to the cost of the liquid dispensed and the other being driven at a rate proportional to the volume of the liquid dispensed, a pair of initial trip members for the latch, each associated with one of the cams, means for conditioning one of the trip members for actuation by a selected actuating portion of its associated cam, an auxiliary pair of cams driven by the register, one of said auxiliary pair of cams being driven at a rate proportional to the cost of the liquid dispensed and the other being driven at a rate proportional to the volume of liquid dispensed, a pair of auxiliary trip members for the latch each associated with one of the auxiliary pair of cams, means responsive to initial movement of the valve control member in a valve closing direction for releasing the auxiliary trip members for actuation by the auxiliary cams, interlocking means on the trip members for preventing release of more than one of the auxiliary trip members, and means for resetting the register and the cams to original starting position.

26. A liquid dispensing apparatus having automatic means for terminating a dispensing operation comprising a register having means for registering the cost and volume of the liquid dispensed, a shut-off valve in the liquid flow line of the dispensing apparatus biased to a closed position, a pump motor switch, a rotatable valve control member connected to the shut-off valve, a releasable latch engageable with the valve control member to hold the member in a first position with the valve fully open and in a second position with the valve partially open, a first pair of cams driven by the register and each having a plurality of spaced actuating portions, one of said pair of cams being driven at a rate proportional to the cost of the liquid dispensed and the other being driven at a rate proportional to the volume of the liquid dispensed, a pair of initial trip members for the latch, each associated with one of the cams, means for conditioning one of the trip members for actuation by a selected actuating portion of its associated cam, an auxiliary pair of cams driven by the register, one of said auxiliary pair of cams being driven at a rate proportional to the cost of the liquid dispensed and the other being driven at a rate proportional to the volume of liquid dispensed, a pair of auxiliary trip members for the latch each associated with one of the auxiliary pair of cams, means responsive to initial movement of the valve control member in a valve closing direction for releasing the auxiliary trip members for actuation by the auxiliary cams, interlocking means for preventing release of more than one of the auxiliary trip members, means for resetting the register and the cams to original starting position, and means for simultaneously opening the pump motor switch and returning the valve control member to its first position with the valve fully open.

27. A liquid dispensing apparatus having automatic means for terminating a dispensing operation comprising a register having a set of number wheels to register cost and a set of number wheels to register volume, a shut-off valve in the liquid flow line of the dispensing apparatus biased to a closed position, a pump motor switch, a rotatable valve control member connected to the shut-off valve having a pair of latching shoulders, a releasable latch engageable with the shoulders in sequence to hold the valve in full open and partially open positions, a first pair of cams having a plurality of spaced promontories, means for driving the first pair of cams including eccentrics driven by the number wheels of lowest order, one of said pair of cams being driven at a rate proportional to the cost of the liquid dispensed and the other being driven at a rate proportional to the volume of the liquid dispensed, a pair of initial trip members for the latch, each associated with one of the cams, manually operated means for conditioning one of the trip members for actuation by a selected promontory of its associated cam, an auxiliary pair of cams driven by the number of wheels of lowest order, one of said auxiliary pair of cams being driven at a rate proportional to the cost of the liquid dispensed and the other being driven at a rate proportional to the volume of liquid dispensed, a pair of auxiliary trip members for the latch, each associated with one of the auxiliary pair of cams, means responsive to initial movement of the valve control member in a valve closing direction for releasing the auxiliary trip members for actuation by the auxiliary cams, means for resetting the register and the cams to original starting position, and means for simultaneously opening the pump motor switch and returning the valve control member to cocked position with the valve fully open.

28. A liquid dispensing apparatus having automatic means for terminating a dispensing operation comprising a register having driving means and resetting means, a shut-off valve in the liquid flow line of the dispensing apparatus biased to a closed position, a pump motor switch, a rotatable valve control member connected to the shut-off valve having a pair of latching shoulders, a releasable latch engageable with the shoulders in sequence to hold the valve in full open and partially open positions, a first pair of cams driven by the register and each having a plurality of actuating means, one of said pair of cams bein driven at a rate proportional to the cost of the liquid dispensed and the other being driven at a rate proportional to the volume of the liquid dispensed, a pair of initial trip members for the latch, each associated with one of the cams, manually operable means for conditioning one of the trip members for actuation by a selected actuating means of its associated cam, an auxiliary pair of cams driven by the register, one of said auxiliary pair of cams being driven at a rate proportional to the cost of the liquid dispensed, and the other being driven at a rate proportional to the volume of liquid dispensed, a pair of auxiliary trip members for the latch each associated with one of the auxiliary pair of cams, means on the valve control member responsive to initial movement thereof in a valve closing direction for releasing the auxiliary trip members for actuation by the auxiliary cams, and means for resetting the register and the cams to original starting position.

29. A liquid dispensing apparatus having automatic means for terminating a dispensing operation comprising a register having driving means and resetting means, a shut-off valve in the liquid flow line of the dispensing apparatus bias to a closed position, a pump motor switch, a rotatable valve control member connected to the shut-off valve having a pair of latching shoulders, a releasable latch engageable with the shoulders in sequence to hold the valve in full open and partially open positions, a first pair of cams driven by the register and each having a plurality of actuating means, one of said pair of cams being driven at a rate proportional to the cost of the liquid dispensed and the other being driven at a rate proportional to the volume of the liquid dispensed, a pair of initial trip members for the latch, each associated with one of the cams, a push button operated means for conditioning one of the trip members for actuation by a selected actuating means of its associated cam, an auxiliary pair of cams driven by the register, one of said auxiliary pair of cams being driven at a rate proportional to the cost of the liquid dispensed and the other being driven at a rate proportional to the volume of liquid dispensed, a pair of auxiliary members for the latch each associated with one of the auxiliary pair of cams, means on the valve control member responsive to initial movement thereof in a valve closing direction for releasing the auxiliary trip members for actuation by the auxiliary cams, means for resetting the register and the cams to original starting position, and means for simultaneously opening the pump motor switch and returning the valve control member to cocked position with the valve fully open.

30. A liquid dispensing apparatus having automatic means for terminating a dispensing operation comprising a register having a set of number wheels to register cost and a set of number wheels to register volume, and means to drive and reset the number wheels, a shut-off valve in the liquid flow line of the dispensing apparatus biased to a closed position, a pump motor switch, a rotatable valve control member connected to the shut-off valve having a pair of latching shoulders, a releasable latch engageable with the shoulders in sequence to hold the valve in full open and partially open positions, a first pair of cams driven by the register and each having a plurality of spaced promontories, one of said pair of cams being driven at a rate proportional to the cost of the liquid dispensed and the other being driven at a rate proportional to the volume of the liquid dispensed, a pair of initial trip members for the latch, each associated with one of the cams, a push button operated means for conditioning one of the trip members for actuation by a selected promontory of its associated cam, an auxiliary pair of cams driven by the register, one of said auxiliary pair of cams being driven at a rate proportional to the cost of the liquid dispensed and the other being driven at a rate proportional to the volume of liquid dispsensed, a pair of auxiliary trip members for the latch each associated with one of the auxiliary pair of cams, means on the valve control member responsive to initial movement thereof in a valve closing direction for releasing the auxiliary trip members for actuation by the auxiliary cams, interlocking means on the trip members for preventing release of one of the auxiliary trip members, means for simultaneously resetting the register and the cams to original starting position, and means for simultaneously opening the pump motor switch and returning the valve control member to cocked position with the valve fully open.

31. A liquid dispensing apparatus as defined in claim 30, wherein the said first pair of cams is connected to the driving means of the register, and the auxiliary pair of cams are driven from the lowest order number wheels of the sets of cost and volume number wheels of the register.

32. A liquid dispensing apparatus as defined in claim 30, wherein the said first pair of cams are driven by eccentrics connected to the number wheels of lowest order, and the auxiliary pair of cams are connected by a gear train to the number wheels of lowest order.

References Cited in the file of this patent

UNITED STATES PATENTS

| | | |
|---|---|---|
| 1,977,781 | Staegemann | Oct. 23, 1934 |
| 2,222,660 | Guibert et al. | Nov. 26, 1940 |
| 2,358,712 | Hinds | Sept. 19, 1944 |
| 2,665,030 | Vroom | Jan. 5, 1954 |
| 2,784,874 | Harper | Mar. 12, 1957 |